(12) United States Patent  (10) Patent No.: US 7,955,035 B2
Singh et al.  (45) Date of Patent: Jun. 7, 2011

(54) RIVET

(75) Inventors: Sumanjit Singh, Gaimersheim (DE); Ziad Khalil, Braunau am Inn (AT); Peter Simon, Dresden (DE)

(73) Assignee: Sumanjit Singh, Gaimersheim (DE)

( * ) Notice: Subject to any disclaimer, the term of this patent is extended or adjusted under 35 U.S.C. 154(b) by 237 days.

(21) Appl. No.: 11/915,971

(22) PCT Filed: May 26, 2006

(86) PCT No.: PCT/EP2006/005085
§ 371 (c)(1),
(2), (4) Date: Feb. 15, 2008

(87) PCT Pub. No.: WO2006/128652
PCT Pub. Date: Dec. 7, 2006

(65) Prior Publication Data
US 2008/0219797 A1  Sep. 11, 2008

(30) Foreign Application Priority Data
May 31, 2005 (AT) .................................. A 933/2005

(51) Int. Cl.
*F16B 13/04* (2006.01)
(52) U.S. Cl. .......................................... 411/34; 411/361
(58) Field of Classification Search .................. 411/34, 411/38, 39, 42, 43, 56, 70; 403/408.1
See application file for complete search history.

(56) References Cited

U.S. PATENT DOCUMENTS

| 2,282,711 | A |   | 5/1942  | Eklund |        |
|-----------|---|---|---------|--------|--------|
| 2,343,143 | A |   | 2/1944  | Gill   |        |
| 2,754,703 | A |   | 7/1956  | Huck   |        |
| 3,047,181 | A |   | 7/1962  | Heidenwolf |    |
| 3,107,572 | A | * | 10/1963 | Orloff | 411/34 |
| 3,286,580 | A |   | 11/1966 | Jeal   |        |
| 3,292,482 | A | * | 12/1966 | Fry et al. | 411/43 |
| 3,390,601 | A | * | 7/1968  | Summerlin | 411/43 |
| 3,426,375 | A |   | 2/1969  | Jeal   |        |
| 3,515,419 | A | * | 6/1970  | Baugh  | 403/408.1 |
| 4,639,174 | A | * | 1/1987  | Denham et al. | 411/34 |
| 4,865,499 | A | * | 9/1989  | Lacey  | 411/34 |
| 4,904,133 | A | * | 2/1990  | Wright | 411/43 |
| 4,919,576 | A | * | 4/1990  | Louw et al. | 411/34 |
| 5,213,460 | A | * | 5/1993  | Sadri et al. | 411/43 |
| 5,435,678 | A | * | 7/1995  | Stencel | 411/178 |
| 5,503,510 | A | * | 4/1996  | Golan  | 411/43 |
| 5,919,016 | A | * | 7/1999  | Smith et al. | 411/34 |
| 6,186,717 | B1 | * | 2/2001 | Cosenza | 411/43 |
| 6,213,699 | B1 | * | 4/2001 | Sadri et al. | 411/43 |
| 6,537,005 | B1 | * | 3/2003 | Denham | 411/42 |
| 7,156,596 | B2 | * | 1/2007 | Makino | 411/34 |

FOREIGN PATENT DOCUMENTS

DE  1 273 265 A  7/1968

(Continued)

*Primary Examiner* — Gary Estremsky
(74) *Attorney, Agent, or Firm* — Greenblum & Bernstein, P.L.C.

(57) ABSTRACT

The invention relates to a rivet for connecting parts, in particular aircraft components, through which holes are formed, the rivet including a sleeve part, which has a rivet head with an axially extending cavity and an adjoining or is composed of such rivet head and a rivet mandrel having an essentially cylindrical base body and a widened rivet mandrel head in relation to the diameter thereof and which passes through the sleeve part and along the cavity with its base body. So that a cost-effective connection with improved loadability can be produced between workpieces, even when they have holes of different sizes for the rivet, the rivet mandrel according to the invention has ribs running axially on the cylindrical base body.

41 Claims, 4 Drawing Sheets

FOREIGN PATENT DOCUMENTS

| | | |
|---|---|---|
| DE | 32 46 625 A1 | 6/1984 |
| DE | 44 45 454 A1 | 6/1996 |
| EP | 0 640 771 A2 | 3/1995 |
| EP | 1 359 330 A1 | 11/2003 |
| GB | 501415 A | 2/1939 |
| GB | 1 271 253 A | 4/1972 |

* cited by examiner

RIVET

BACKGROUND OF THE INVENTION

1. Field of the Invention

The invention relates to a rivet for connecting parts, in particular aircraft components, through which holes are formed, the rivet including a sleeve part having a rivet head with an axially extending cavity and an adjoining shank, is composed of such rivet head and a rivet mandrel having an essentially cylindrical base body and a widened rivet mandrel head in relation to the diameter thereof and which passes through the sleeve part and along the cavity with its base body.

2. Description of Background and Other Information

Rivets of the aforementioned type are produced in large production runs and have a wide application in joining workpieces. In particular, when workpieces made of different materials are to be connected and techniques such as soldering, welding or adhesive bonding cannot be used to join the workpieces, joining using rivets of this type represents a practicable alternative method of connection. The workpieces to be connected are thereby first provided with bored holes and the workpieces are placed against one another, ideally with axially aligned orientation of the axes of the holes. Subsequently, a rivet head of a sleeve part is placed on a borehole of the first workpiece and held there in a fixed manner, and a rivet mandrel penetrating the bores is drawn through the fixed rivet head and a shank optionally adjoining it, until the widened rivet mandrel head thereof comes to bear against the second workpiece or the widened rivet mandrel head has deformed an end-side sleeve part with the formation of a non-positive connection. Non-positive connections of this type are often found, e.g., in aircraft construction, where individual components of different types of materials are combined with one another.

In order to join together different types of workpieces by riveting, it is necessary, as mentioned, to provide them with bores in which there is space for a rivet. In practice, in this context the case often occurs that two bores that are provided to accept a rivet have different bore diameters. If the necessary bores are produced separately in the workpieces, it is difficult to obtain exactly the same bore diameters. But even when workpieces that are to be connected and are made of different types of materials are placed one on top of the other and respectively corresponding bores are produced in one step or through a single drilling operation, the bores thus produced can have different bore diameters due to different material properties. Furthermore, the type of drilling operation can thereby have an impact on the size and shape of corresponding bores, as is known, e.g., for laser drilling.

If workpieces with different bore diameters are joined together by riveting, the result is that the rivet in the bores cannot bear against all the bore walls or against both workpieces. A connection between the workpieces therefore occurs at least mainly only through a non-positive closure, and one workpiece has a looseness in a plane perpendicular to the bore axes. A loadability of the rivet connection is correspondingly limited.

Attempts have been made according to the prior art to avoid this disadvantage by reaming the necessary bores. However, a reaming operation represents an additional step, which is time-consuming and costly and, in particular in the connection of aircraft components, when thousands of bores are to be reamed on one component, this can significantly reduce productivity.

SUMMARY OF THE INVENTION

Based on the prior art described above, the invention provides a rivet of the aforementioned type with which a cost-effective connection with improved loadability can be produced between workpieces, even when such workpieces have bores of different sizes for the rivet.

More particularly, a rivet according to the invention is of the aforementioned type, except that the rivet mandrel has ribs running axially on the cylindrical base body, which ribs, in a particular embodiment, are arranged between the rivet mandrel head and the cavity.

A rivet according to the invention in particular has the advantage that, when workpieces are connected by drawing the rivet mandrel into or through the rivet head, the rivet, due to the ribs provided on the cylindrical base body, bears against both bore walls or workpieces at least in some sections, even with bores of different sizes in the workpieces, and a connection can be easily produced via a non-positive or also via a positive component. Positional inaccuracies caused by an orientation of the bore axes that are not axially aligned can also be offset thereby.

The ribs provided according to the invention are also advantageous from another aspect, because with a placement process by forming material of the workpieces to be connected, or material of the sleeve part, such material can flow into the free spaces present between the ribs so that drawing in the rivet mandrel compared to a conceivable conical embodiment of a rivet mandrel is facilitated or even made possible at all.

It is thereby advantageous with respect to a uniformly high loadability of a rivet connection when the ribs are arranged in a rotationally symmetrical manner to a longitudinal axis of the rivet mandrel.

It is also favorable in order to utilize or maximize effects of the ribs over the greatest possible length when the ribs adjoin the rivet mandrel head.

As has been shown in tests, it can also be favorable with respect to the largest possible contact surface with an average surface pressure between the rivet mandrel and the shank or the workpieces and consequently a high loadability in terms of strength of a rivet connection, if the ribs at least in some areas have a circular arc shape or, in particular, an acute-angled rib outer contour.

In order to make it possible to draw in the rivet mandrel with a low expenditure of force, the ribs can also be embodied at least in part with wedge surfaces. Alternatively, the ribs can be embodied along their axial extension with essentially the same cross section, which is advantageous with respect to a high surface pressure between ribs and workpieces or the shank of the sleeve part. It is also possible for the ribs, seen from the rivet mandrel head in the direction of the rivet head, to first have an area with a constant cross section to which a sloped or wedge-shaped area adjoins. It is thereby possible to draw in the rivet mandrel easily with high surface pressure at the same time.

A rivet mandrel of a rivet according to the invention can be embodied as hollow. However, it is advantageous if the rivet mandrel is solid, because the rivet mandrel can then better withstand radial forces acting thereon, the rivet connection having a higher rigidity, and a greater tensile force thereby can be exerted on the rivet mandrel while it is being drawn in, without the rivet mandrel being damaged.

The ribs can be applied to the rivet mandrel after manufacture, e.g., by soldering or adhesive bonding or another type of connection technique or mechanism. However, every connection point represents a potential weak spot under stress. Therefore, in a particular embodiment, the rivet mandrel is embodied as one-piece. Rolling or cold working are suitable and simple methods for producing a solid rivet mandrel with ribs running axially.

It has proven useful in a manner to be particularly emphasized if the sleeve part has a shank having a constant outside diameter, the first end of which shank adjoins the cavity of the rivet head and the second end of which shank is in contact with a rivet mandrel head having at least the same outside diameter, that the shank be embodied in the direction from the first end to the second end with an expansion area having a constant inside diameter and an adjoining compression area having an at least partially increased inside diameter, and the ribs bearing in an area corresponding to the compression area of the shank.

With this variant in a blind-rivet embodiment, an excellent surface pressure can be achieved between the rivet mandrel and the shank as well as between the shank and the workpieces after a placement operation due to the ribs. The ribs make it possible on the one hand for the rivet mandrel to be drawn in with a lower expenditure of force compared to the prior art, because the material of the shank can in part flow into free spaces between the ribs and, through the deformation, a consolidation is achieved which is so high that a highly loadable connection is achieved, although drawing in the rivet mandrel is not made more difficult or impeded. On the other hand, while being drawn in, the ribs at the same time produce an expansion of the shank at least in parts and press it against the bore walls in the workpieces producing a positive connection, so that after the placement operation the shank and the rivet mandrel as well as the shank and the workpieces are firmly connected to one another. A non-positive connection as well as an excellent positive connection is thus produced between the rivet mandrel and the shank on the one hand and between the shank and the workpieces on the other hand.

For special purposes, e.g., when the rivet head and the shank are subjected to greatly divergent stresses after the placement of the rivet, it can also be provided for the rivet head and the shank of the sleeve part to be made of different materials. For example, the rivet head and the shank of the sleeve part can be produced separately as single components that, together with a rivet mandrel form a kit, which are assembled only upon production of a rivet connection. In this case the single components can be made of different materials that are selected according to the stress to be expected on the single component. It is also possible for the rivet sleeve to be made of one material and to have different properties in the area of the rivet head than in the area of the shank, e.g., after a locally limited heat treatment or a thermo-mechanical treatment of the rivet head.

When an inner surface of the shank in the compression area is formed according to a surface of the rivet mandrel in the area of the same embodied with ribs, a particularly high surface pressure can be achieved between the shank of the sleeve part and the workpieces as well as between the shank and the rivet mandrel. In this variant of a rivet a non-positive closure as well as a full-surface positive closure is achieved, which leads to highly loadable rivet connections.

BRIEF DESCRIPTION OF THE DRAWINGS

The invention is described in greater detail with reference to the appended drawings, which illustrate exemplary embodiments of the invention, whereby.

DETAILED DESCRIPTION OF THE INVENTION

Figure 1:
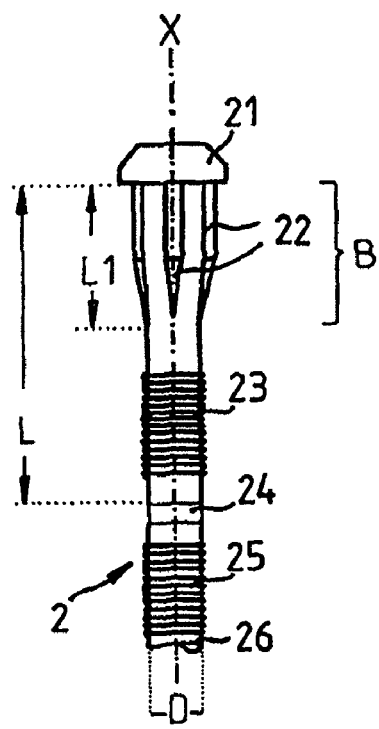
FIG. 1 illustrates a rivet mandrel of a rivet according to the invention.

FIG. 1 shows by way of example a rivet mandrel 2 as it is used in a rivet according to the invention. The rivet mandrel 2, which is generally made of a metallic material and is advantageously produced entirely from a high-strength steel alloy in a solid manner, has an essentially cylindrical base body 26 with a longitudinal axis X and a diameter D. Grooves 23, located in planes perpendicular to the longitudinal axis X and extending around the axis X, can be provided on the base body 26, as shown in diagrammatic form in FIG. 1, via which grooves the rivet mandrel 2 is brought into connection with a rivet head during placement of the rivet or is connected to a rivet head in a positive manner after placement. In a particular embodiment, the grooves 23 are embodied asymmetrically, in order to increase an initial tension. Furthermore, grooves 25 are provided via which the rivet mandrel 2 can be drawn with a placement device. Furthermore, the rivet mandrel 2 has a predetermined breaking point 24, at which the rivet mandrel 2 is designed to break at the end of a placement process or after the production of a rivet connection, so that the end of the rivet mandrel 2, in a particular embodiment, is approximately flush with a head of a rivet. In addition, on one end the rivet mandrel 2 has a rivet mandrel head 21 that is widened with respect to the diameter D of the base body 26, to which rivet mandrel head ribs 22 adjoin. The ribs 22 run axially or parallel to the longitudinal axis X of the rivet mandrel 2 and are arranged in a rotationally symmetrical manner around the longitudinal axis X, a number of the ribs 22 depending on the diameter D of the cylindrical base body 26 and, e.g., with a diameter D of 10 mm, lying between four and ten, so that, on the one hand, the rivet mandrel 2 can be drawn in well but, on the other hand, a high surface pressure is also achieved between the rivet mandrel 2 and a shank or workpieces. As shown in both FIGS. 1 and 2, the ribs 22 project radially beyond non-ribbed portions of the base body 26 of the rivet mandrel.

Figure 2:
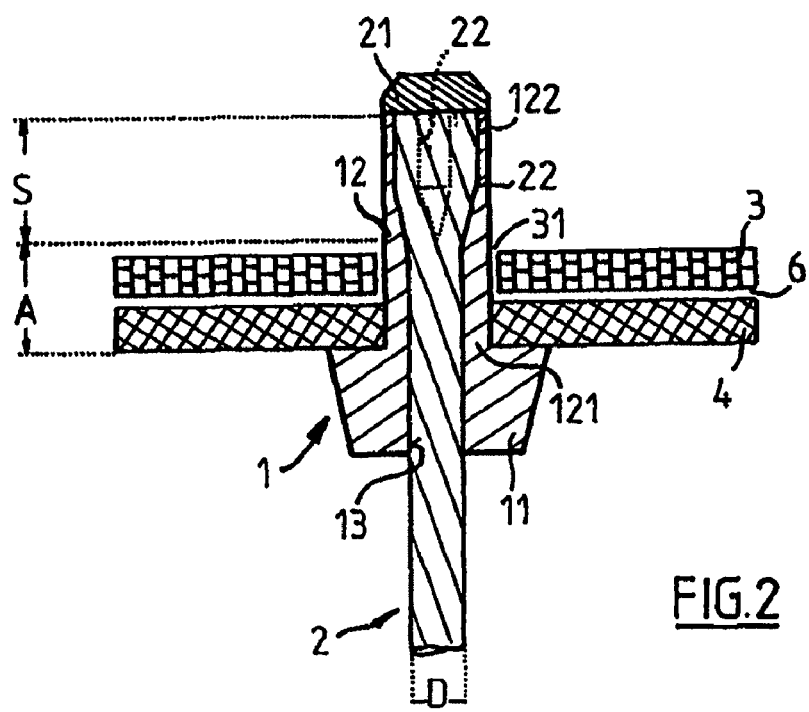
FIG. 2 illustrates a blind rivet before a placement process.

FIG. 2 shows a cross section of a blind rivet according to the invention with a rivet mandrel 2 according to FIG. 1 after insertion in bores of two workpieces 3, 4 to be connected, but before a placement of the rivet. In addition to the rivet mandrel 2 described, the blind rivet comprises a sleeve part 1 with a rivet head 11 and a shank 12, which with one end 121 adjoins the axially extending cavity of the rivet head 11. The shank 12 is embodied with a constant outside diameter. The rivet mandrel head 21 of the rivet mandrel 2 is placed in the area of its second end 122, the rivet mandrel 21 in the mating area on the shank 12 having the same outside diameter as the shank and subsequently being embodied in a tapering manner. This makes it possible to insert the rivet, even if the workpiece 3 is not accessible.

In the interior, the shank 12 of the sleeve part 1 has an axially extending cavity that is continuous with an axially extending cavity of the rivet head 11 of the sleeve part, as shown in FIG. 2. More specifically, the sleeve part 1 has an essentially cylindrical cavity in the area of the rivet head 11 and the expansion area A of the shank 12 adjoining it, which cavity accepts the correspondingly dimensioned cylindrical base body 26 of the rivet mandrel 2. In a compression area S adjoining the expansion area A, the shank 12 is embodied with an increased inside diameter compared to the expansion area A, in order to provide space for the ribs 22 of the rivet mandrel 2. The increased inside diameter of the shank 12 is designed such that the ribs 22 bear against the shank 12 inside at some points. The individual parts of the rivet are then no longer disengaged from one another, which facilitates the handling of the rivet during an assembly.

The situation shown in FIG. 2 occurs, as mentioned, before the placement of the rivet, therefore before the rivet mandrel 2 is drawn into the sleeve part 1. If the bores necessary for the rivet in the workpieces 3, 4 have different bore diameters, the shank 12 does not bear against both workpieces 3, 4, but has a free spacing 31 from a workpiece 3 and optionally also from a workpiece 4.

Figure 3:
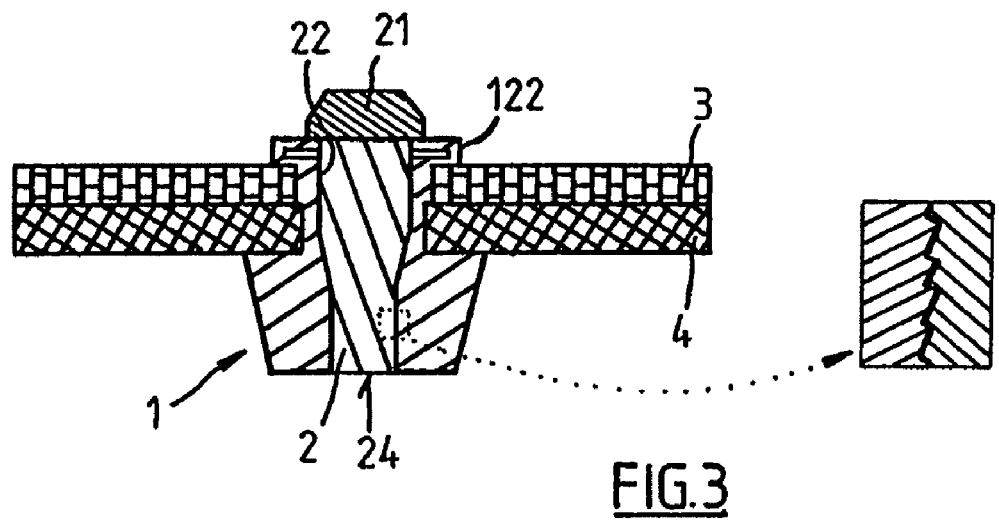
FIG. 3 illustrates a blind rivet after a placement process.

If the rivet mandrel 2 is now drawn into the sleeve part 1 by drawing on grooves 25 while holding the sleeve part 1 on the rivet head 11, the rivet mandrel head 21 placed on the shank 12, with the rivet mandrel head 21 having a size, transverse to an axial extent of the sleeve part 1, that at least covers an entirety of the end of the shank 12, causes a compression or deformation of the shank 12 on its second end 122, so that it is folded and a driven head is formed, as shown in FIG. 3, the rivet mandrel head 21 being spaced from the connected workpieces 3, 4 by a distance of twice the wall thickness of the second end 122 of the shank 12. As such, the radially projecting ribs 22 create an expanded area of the shank 12 beneath the folded end 122 through the thicknesses of the workpieces 3, 4 to the rivet head 11. FIG. 3 shows the ribs extending axially without interruption through the thicknesses of the workpieces. In other words, at the same time as the shank 12 on its second end 122 is being compressed and deformed, the ribs 22 adjoining the rivet mandrel head 21 penetrate into the area of the shank 12 having a smaller inside diameter and produce an expansion of the shank 12 there, i.e., along an axially extending portion of the shank, where the outside periphery of the shank is increased from the initial diameter, so that the looseness provided by the free space 31 present between the shank 12 and workpiece 3 is eliminated. During expansion, if the solid rivet mandrel 2 bears against the shank 12 only in the area of the ribs 22, excess material of the shank 12 can also be forced into free spaces between the ribs 22, so that a good positive closure and a favorable stress distribution in the rivet and the workpieces 3, 4 is achieved. Because the shank 12 is thin-walled at its end 122, and the rivet mandrel 2 easily slides into the shank 12 due to the ribs 22 shaped in an elongated manner, only slight force is necessary to place the rivet. At the end of the placement process the looseness 31 between the shank 12 and the spacing 6 between the workpieces 3, 4 are finally no longer present and the workpieces 3, 4 are connected to one another in a non-positive and positive manner.

After the placement of the rivet, the base body 26 bears against an inner surface 13 of the rivet head 11 and against the shank 12 essentially over the entire surface. This configuration is shown in FIG. 3. In this connection it is favorable, as mentioned, if the grooves 23 are embodied asymmetrically or in a sawtooth manner in cross section, as can be seen from the enlarged section of FIG. 3.

A looseness can also be present between the workpiece 4 and the shank 12 before the placement of the rivet. In such a case, during placement of the rivet a gap between the shank 12 and the workpiece 3 as well as a gap between the shank 12 and the workpiece 4 are closed due to the deformation of the shank 12. Likewise, the invention covers variants in which the shank 12 is embodied with a constant wall thickness.

Alternatively to the embodiment shown in FIGS. 2 and 3, it is possible with otherwise identical geometric design to apply the ribs to the shank 12 instead of to the rivet mandrel 2, but this is also associated with higher production costs, because recessing ribs into the shank is more complex than recessing ribs in an outer side of the rivet mandrel.

Figure 4:
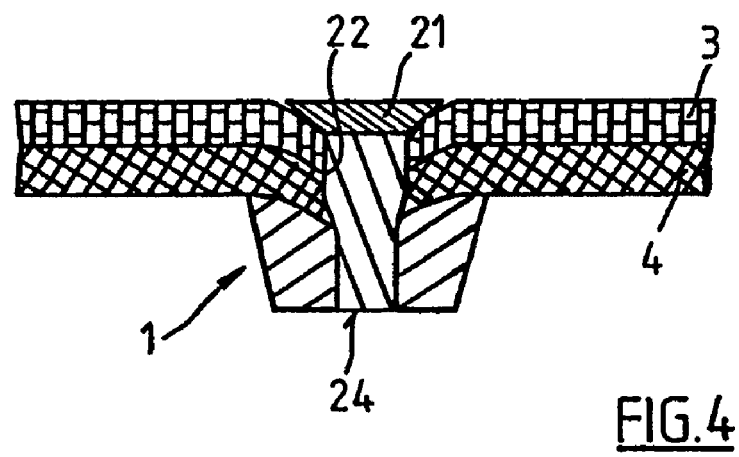
FIG. 4 illustrates a rivet having a countersunk-head after a placement process.

FIG. 4 shows a rivet according to the invention, in which the sleeve part 1 comprises only a rivet head 12, no shank being present, after the placement of the rivet. The rivet mandrel 2, which is equipped with a rivet mandrel head 21 embodied as a countersunk head, renders possible a flush installation in the area of a surface of the workpiece 3. With this embodiment variation, the ribs 22 of the rivet mandrel 2 bear directly against the workpieces 3, 4, which are deformed on the bore side through the placement of the rivet, and thus produce a positive closure.

Figure 5A:
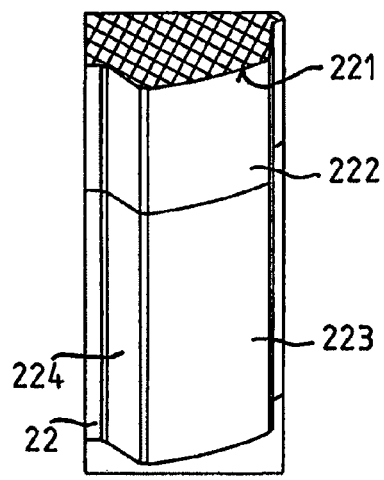
FIG. 5a illustrates a rib located on a base body of a rivet mandrel, which rib is embodied with an essentially identical cross section along its axial extension.
Figure 5B:
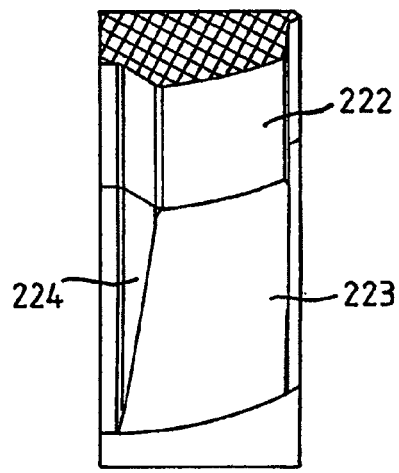
FIG. 5b illustrates a rib located on a base body of a rivet mandrel, which rib is embodied with a flat wedge surface and an essentially circular arc-shaped rib outer contour.
Figure 5C:
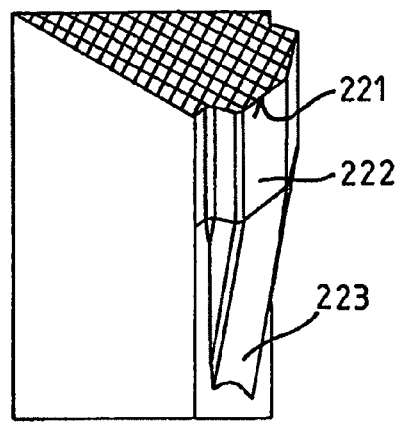
FIG. 5c illustrates a rib located on a base body of a rivet mandrel, which rib is embodied with a curved wedge surface and an acute-angled rib outer contour.

FIGS. 5a, 5b, and 5c show possible embodiments of ribs 22, which have proven to be of value in tests. As shown in FIG. 5a, a rib 22 can be embodied with an essentially identical cross section along its longitudinal extension and an approximately circular arc-shaped rib outer contour 221. During the placement of a rivet according to FIG. 2, the circular arc-shaped front surfaces 222, 223 running parallel to the longitudinal axis X of the rivet mandrel 2 slide along the shank 12 and expand it. Simultaneously, material of the shank 12 can flow into the free spaces present between the ribs 22 and lie against the rib side surfaces 224 there.

In an embodiment further improved over the embodiment according to FIG. 5a, each of the axially extending ribs 22 according to FIG. 5b can also be embodied with a front surface 223, each of the surfaces 223 tapering in a direction away from the rivet mandrel head 21 that acts as a wedge surface and facilitates a sliding of the rivet mandrel 2 when drawn in.

Finally, FIG. 5c shows a particularly favorable embodiment of ribs 22. A high surface pressure or optimization of stresses in the rivet and the workpieces 3, 4 with good drawing-in properties of the same are given with this type of shape of ribs 22.

In a further possible embodiment, the ribs 22 can also be graduated and/or embodied with different cross sections.

The ribs 22 are embodied with a length L1 and a width such that when the rivet mandrel 2 is drawn in an expansion of the shank 12 or of the workpieces 3, 4 occurs. If a length of the ribs is at least 25%, and more than 40% in a particular embodiment, of the length L of the base body 26 between the rivet mandrel head 21 and a predetermined breaking point 24 and/or the ribs 22 in the rib area B (FIG. 1) cover at least 40%, and more than 50% in a particular embodiment, of the outer surface of the base body 26, a particularly effective expansion of the shank 12 and an inflow of material between the ribs 22 that is advantageous for a high surface pressure can be achieved.

Figure 6:
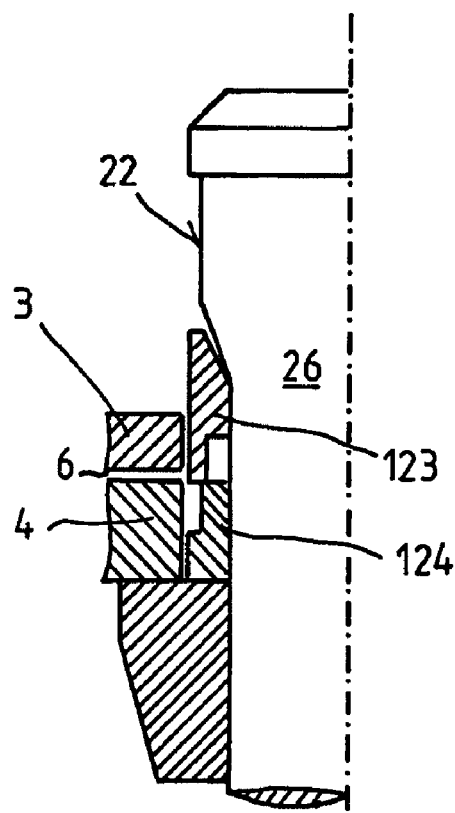
FIG. 6 illustrates a partial representation of a rivet according to the invention, the sleeve part of which is composed of several component parts.
Figure 7:
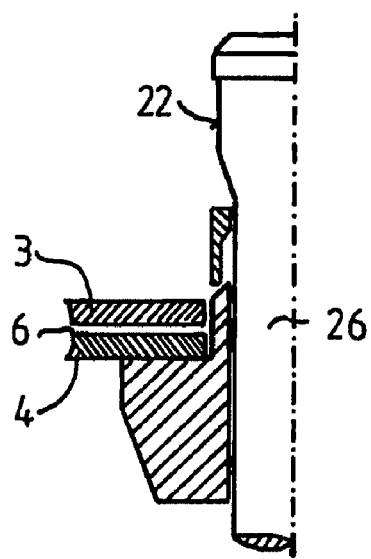
FIG. 7 illustrates another rivet, the sleeve part of which is composed of several component parts, in a partial representation.

Finally, FIGS. 6 and 7 show variants of a rivet according to the invention, which have proven to be advantageous with respect to the closing of an axial gap 6 (see FIGS. 1, 6, 7). In these variants the sleeve part 1 comprises a shank 12 that is composed of several parts, so that before and/or during a shaping of a driven head an axial force acts on a workpiece 3.

For example, with the variant shown in FIG. 6, when the rivet mandrel 2 is drawn in, the upper sleeve 123 is expanded by the ribs 22, the gap between the sleeve and the top sheet 3 is closed and, subsequently, the upper sleeve 123 together with the top sheet 3 are carried along and the gap 6 between the sheets is bridged before the upper sleeve 123 as well as the lower sleeve 124 are expanded even more and a loadable positive closure is produced.

In the variant shown in FIG. 7, it is ensured in a similar manner that a force acting axially is exerted on the workpiece 3 even before an expansion of the shank 12 in the direction of the workpieces 3, 4 and an embodiment of a positive closure, so that the gap 6 can be closed. Instead of this type of a multiple-part embodiment of the shank, it can also be embodied in one piece with a predetermined breaking point or one or more predetermined deformation points.

The invention claimed is:

1. A rivet for connecting at least two parts, each of said parts having a hole through which at least a portion of said rivet extends, said rivet comprising:
   a sleeve part having a rivet head with an axially extending cavity and a shank adjoining the rivet head;
   a rivet mandrel having a substantially cylindrical base body and a rivet mandrel head, said rivet mandrel head being enlarged with respect to a diameter of said base body, the base body of said rivet mandrel configured and arranged to penetrate the sleeve part of the rivet;
   said rivet mandrel further comprising a plurality of ribs extending axially of the base body and projecting over the substantially cylindrical base body in a radial direction, said ribs being embodied with wedge surfaces directed towards the rivet head, said ribs being structured and arranged to produce a widening of the shank when the rivet mandrel is drawn in, with material of the shank having flowed in and being situated between the ribs;
   after placement of the rivet, a length of the ribs creating an expanded area of the shank along at least 40% of a length of the base body between the rivet mandrel head and a predetermined breaking point of the base body.

2. A rivet according to claim 1, wherein:
   after placement of the rivet, the ribs extend from the rivet mandrel head to the cavity of the rivet head of the sleeve part of the rivet.

3. A rivet according to claim 1, wherein:
   the base body of the rivet mandrel is penetrated into the axially extending cavity of the sleeve part of the rivet, said base body bearing against an inner surface of the rivet head.

4. A rivet according to claim 1, wherein:
   the ribs are arranged in a rotationally symmetrical manner with respect to a longitudinal axis of the rivet mandrel.

5. A rivet according to claim 1, wherein:
   the ribs adjoin the rivet mandrel head.

6. A rivet according to claim 1, wherein:
   the ribs, at least in some areas, have a circular arc-shaped outer contour or an acute-angled outer contour.

7. A rivet according to claim 1, wherein:
   the ribs have a substantially constant cross section along an axial extent of the ribs.

8. A rivet according to claim 1, wherein:
   the rivet mandrel is solid.

9. A rivet according to claim 1, wherein:
   the rivet mandrel is produced by having been rolling or cold worked.

10. A rivet according to claim 1, wherein:
    the rivet mandrel is embodied in one piece.

11. A rivet according to claim 1, wherein:
    the shank of the sleeve part has a constant outside diameter, a first end of the shank adjoining the cavity of the rivet head and the second end of the shank being in connection with the rivet mandrel head, said rivet mandrel head having an outside diameter equal to an outside diameter of the second end of the shank;
    the shank is embodied in a direction from the first end to the second end with an expansion area with a constant inside diameter and an adjoining compression area with at least partially increased inside diameter;
    the ribs bear in an area corresponding to the compression area of the shank.

12. A rivet according to claim 11, wherein:
    the rivet head and the shank of the sleeve part are made of different materials.

13. A rivet according to claim 11, wherein:
    the sleeve part is made of one material and has different properties in the area of the rivet head than in the area of the shank, as a result of a locally limited heat treatment.

14. A rivet according to claim 11, wherein:
    the partially increased diameter of the shank in the compression area has a shape to receive a portion of the rivet mandrel having said ribs.

15. A rivet according to claim 11, wherein:
    the sleeve part comprises a shank composed of several parts and/or has a predetermined breaking point or a predetermined deformation point, so that an axial force component acts on a part before and/or during a shaping of a driven head.

16. A rivet according to claim 1, wherein:
    a length of the ribs is more than 40% of a length of the base body between the rivet mandrel head and a predetermined breaking point of the base body.

17. A rivet according to claim 1, wherein:
    the ribs constitute a rib area covering at least 40% of the outer surface of the base body.

18. A rivet according to claim 1, wherein:
    the ribs constitute a rib area covering more than 50% of the outer surface of the base body.

19. A rivet according to claim 1, wherein:
    the plurality of ribs are structured and arranged to be positioned within a thickness of the two parts after placement of the rivet within the two parts.

20. A method of connecting two workpieces with the rivet of claim 1, said method comprising:
    providing each of said two workpieces with respective bores;
    inserting said rivet mandrel through said bores of the two workpieces with said rivet mandrel head located on a first side of the two workpieces;
    inserting said sleeve part through said bores of the two workpieces with said rivet head of said sleeve part located on a second side of the two workpieces, whereby said cylindrical base body of the rivet mandrel extends through said shank of the sleeve part;
    drawing in the rivet mandrel into the sleeve part, thereby producing a widening of the shank, with material of the shank flowing in between the ribs of the rivet mandrel.

21. A method according to claim 20, wherein:
    said drawing in includes positioning the plurality of ribs within a thickness of the two workpieces.

22. A rivet according to claim 1, wherein:
    the shank of the sleeve part extends from the rivet head to an end in engagement with the rivet mandrel head;

the rivet mandrel head has a size, transverse to an axial extent of the sleeve part, that at least covers an entirety of the end of the shank of the sleeve part.

23. A rivet according to claim 1, wherein:
the plurality of ribs projects radially beyond a non-ribbed portion of the base body.

24. A rivet according to claim 1, wherein:
the plurality of ribs are structured and arranged to be positioned, and to be axially uninterrupted, within a thickness of the two parts after placement of the rivet within the two parts.

25. A rivet for connecting at least two parts, each of said parts having a hole through which at least a portion of said rivet extends, said rivet comprising:
a sleeve part having a rivet head with an axially extending cavity;
a rivet mandrel having a substantially cylindrical base body and a rivet mandrel head, said rivet mandrel head being enlarged with respect to a diameter of said base body, the base body of said rivet mandrel configured and arranged to penetrate the sleeve part of the rivet;
said rivet mandrel further comprising a plurality of ribs extending axially of the base body and projecting from the substantially cylindrical base body in a radial direction, said ribs being configured and arranged to enable material of the parts to flow in between pairs of ribs when the rivet mandrel is drawn in, said ribs being embodied with wedge surfaces directed towards the rivet head;
a length of the ribs being at least 40% of a length of the base body between the rivet mandrel head and a predetermined breaking point of the base body;
the plurality of ribs are structured and arranged to create radially extending expanded areas, after placement of the rivet, against both of the two parts.

26. A rivet according to claim 25, wherein:
the plurality of ribs are structured and arranged to be positioned within a thickness of the two parts after placement of the rivet within the two parts.

27. A rivet according to claim 25, wherein:
in said radially extending expansion areas, after said placement of the rivet, the rivet is structured and arranged such that the ribs bear directly against the two parts.

28. A rivet according to claim 25, wherein:
the plurality of ribs projects radially beyond a non-ribbed portion of the base body.

29. A rivet according to claim 25, wherein:
the plurality of ribs are structured and arranged to be positioned, and to be axially uninterrupted, within a thickness of the two parts after placement of the rivet within the two parts.

30. An assembly comprising:
two components of an aircraft;
a rivet for joining together said two aircraft components, said rivet comprising:
a sleeve part having a rivet head with an axially extending cavity and a shank adjoining the rivet head;
a rivet mandrel having a substantially cylindrical base body and a rivet mandrel head, said rivet mandrel head being enlarged with respect to a diameter of said base body, the base body of said rivet mandrel configured and arranged to penetrate the sleeve part of the rivet;
said rivet mandrel further comprising a plurality of ribs extending axially of the base body and projecting over the substantially cylindrical base body in a radial direction, said ribs being embodied with wedge surfaces directed towards the rivet head and producing a widening of the shank when the rivet mandrel is drawn in, with material of the shank flowing in between the ribs;
a length of the ribs extending, after placement of the rivet, at least partially along thicknesses of both of the two components and creates expanded areas of the shank.

31. An assembly according to claim 30, wherein:
the plurality of ribs are structured and arranged to be positioned within a thickness of the two components after placement of the rivet within the two parts.

32. An assembly according to claim 30, wherein:
the shank of the sleeve part extends from the rivet head to an end in engagement with the rivet mandrel head;
the rivet mandrel head has a size, transverse to an axial extent of the sleeve part, that at least covers an entirety of the end of the shank of the sleeve part.

33. An assembly according to claim 30, wherein:
the plurality of ribs projects radially beyond a non-ribbed portion of the base body.

34. A rivet according to claim 30, wherein:
the plurality of ribs are structured and arranged to be positioned, and to be axially uninterrupted, within a thickness of the two parts after placement of the rivet within the two parts.

35. An assembly according to claim 30, wherein:
the ribs have a length of at least 40% of a length of the base body between the rivet mandrel head and a predetermined breaking point of the base body.

36. A rivet for connecting at least two parts, each of the parts having a hole through which at least a portion of the rivet is adapted to extend, said rivet comprising:
a sleeve part comprising:
a rivet head having an axially extending cavity; and
a shank adjoining the rivet head, said shank having an axially extending cavity continuous with the axially extending cavity of the rivet head;
a rivet mandrel comprising:
a substantially cylindrical base body;
a rivet mandrel head being enlarged with respect to a diameter of said base body,
a plurality of ribs extending axially from the rivet mandrel head along the base body and projecting over the substantially cylindrical base body in a radial direction, said ribs having wedge surfaces tapering in a direction away from the rivet mandrel head;
an uninterrupted length of the plurality of ribs being at least 40% of a length of the base body between the rivet mandrel head and a predetermined breaking point of the base body;
the rivet being capable of having a before-placement configuration and an after-placement configuration;
said before-placement configuration comprising:
the base body of said rivet mandrel extending within at least the axially extending cavity of the rivet head of the sleeve part;
the plurality of ribs of said rivet mandrel extending within the axially extending cavity of the shank of the sleeve part;
the shank of the sleeve part having a substantially constant outside dimension;
said after-placement configuration comprising:
the shank of the sleeve part having an axially extending portion with an outside dimension expanded from said constant outside dimension;

the uninterrupted length of the plurality of ribs extending within the axially extending portion.

37. A rivet according to claim 36, wherein:
the shank of the sleeve part extends from the rivet head to an end in engagement with the rivet mandrel head;
the rivet mandrel head has a size, transverse to an axial extent of the sleeve part, that at least covers an entirety of the end of the shank of the sleeve part.

38. An assembly according to claim 36, wherein:
the plurality of ribs projects radially beyond a non-ribbed portion of the base body.

39. A rivet for connecting at least two parts, each of said parts having a hole through which at least a portion of said rivet extends, said rivet comprising:
a sleeve part having a rivet head with an axially extending cavity and a shank adjoining the rivet head, said shank having a first end at the rivet head and an axially opposite second end;
a rivet mandrel having a substantially cylindrical base body and a rivet mandrel head, said rivet mandrel head being enlarged with respect to a diameter of said base body, the base body of said rivet mandrel configured and arranged to penetrate the sleeve part of the rivet;
said rivet mandrel further comprising a plurality of ribs extending axially of the base body, said ribs being embodied with wedge surfaces directed towards the rivet head, said ribs being structured and arranged to produce a widening of the shank when the rivet mandrel is drawn in, with material of the shank having flowed in and being situated between the ribs;
a length of the ribs being at least 25% of a length of the base body between the rivet mandrel head and a predetermined breaking point of the base body;
after placement of the rivet, the ribs extending axially from the cavity of the rivet head of the sleeve part toward the rivet mandrel head at least to a point along the base body that is spaced from the rivet mandrel head by twice the wall thickness of the second end of the shank.

40. A rivet for connecting at least two parts, each of the parts having a hole through which at least a portion of the rivet is adapted to extend, said rivet comprising:
a sleeve part comprising:
a rivet head having an axially extending cavity; and
a shank adjoining the rivet head, said shank having an axially extending cavity continuous with the axially extending cavity of the rivet head;
a rivet mandrel comprising:
a substantially cylindrical base body;
a rivet mandrel head being enlarged with respect to a diameter of said base body,
a plurality of ribs extending axially from the rivet mandrel head along the base body, said ribs having wedge surfaces tapering in a direction away from the rivet mandrel head;
a length of the ribs being at least 25% of a length of the base body between the rivet mandrel head and a predetermined breaking point of the base body;
the rivet being capable of having a before-placement configuration and an after-placement configuration;
said before-placement configuration comprising:
the base body of said rivet mandrel extending within at least the axially extending cavity of the rivet head of the sleeve part;
the plurality of ribs of said rivet mandrel extending within the axially extending cavity of the shank of the sleeve part;
the shank of the sleeve part having a substantially constant outside dimension;
said after-placement configuration comprising:
the shank of the sleeve part having an axially extending portion with an outside dimension expanded from said constant outside dimension;
the plurality of ribs extending within the axially extending portion;
the plurality of ribs extending axially from the cavity of the rivet head of the sleeve part toward the rivet mandrel head at least to a point along the base body that is spaced from the rivet mandrel head by twice the wall thickness of the second end of the shank.

41. A rivet for connecting at least two parts, each of the parts having a hole through which at least a portion of the rivet is adapted to extend, said rivet comprising:
a sleeve part comprising:
a rivet head having an axially extending cavity; and
a shank adjoining the rivet head, said shank having an axially extending cavity continuous with the axially extending cavity of the rivet head;
a rivet mandrel comprising:
a substantially cylindrical base body;
a rivet mandrel head being enlarged with respect to a diameter of said base body,
a plurality of ribs extending axially from the rivet mandrel head along the base body and projecting from the substantially cylindrical base body in a radial direction, said ribs having wedge surfaces tapering in a direction away from the rivet mandrel head;
a length of the ribs being at least 25% of a length of the base body between the rivet mandrel head and a predetermined breaking point of the base body;
the rivet being capable of having a before-placement configuration and an after-placement configuration;
said before-placement configuration comprising:
the base body of said rivet mandrel extending within at least the axially extending cavity of the rivet head of the sleeve part;
the plurality of ribs of said rivet mandrel extending within the axially extending cavity of the shank of the sleeve part;
the shank of the sleeve part having a substantially constant outside dimension;
said after-placement configuration comprising:
the shank of the sleeve part having an axially extending portion with an outside dimension expanded from said constant outside dimension;
the plurality of ribs extending axially within the axially extending portion of the shank of the sleeve part, from the cavity of the rivet head of the sleeve part toward the rivet mandrel head to at least a point along the base body of the rivet mandrel that is spaced from the head of the rivet mandrel by twice the wall thickness of the second end of the shank.

\* \* \* \* \*